(12) United States Patent
Chen et al.

(10) Patent No.: US 11,593,396 B2
(45) Date of Patent: Feb. 28, 2023

(54) SMART DATA OFFLOAD SYNC REPLICATION

(71) Applicant: EMC IP Holding Company LLC, Hopkinton, MA (US)

(72) Inventors: Xiangping Chen, Sherborn, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 218 days.

(21) Appl. No.: 17/029,508

(22) Filed: Sep. 23, 2020

(65) Prior Publication Data

US 2022/0092078 A1 Mar. 24, 2022

(51) Int. Cl.
  *G06F 16/00* (2019.01)
  *G06F 16/27* (2019.01)
  *G06F 13/20* (2006.01)
  *G06F 16/178* (2019.01)

(52) U.S. Cl.
  CPC .............. *G06F 16/27* (2019.01); *G06F 13/20* (2013.01); *G06F 16/178* (2019.01)

(58) Field of Classification Search
  CPC ......... G06F 16/27; G06F 13/20; G06F 16/178
  See application file for complete search history.

(56) References Cited

U.S. PATENT DOCUMENTS

| | | | |
|---|---|---|---|
| 6,141,743 A * | 10/2000 | Strongin | G06F 13/4217 710/3 |
| 6,496,908 B1 | 12/2002 | Kamvysselis et al. | |
| 6,553,464 B1 | 4/2003 | Kamvysselis et al. | |
| 6,640,280 B1 | 10/2003 | Kamvysselis et al. | |
| 6,862,632 B1 | 3/2005 | Halstead et al. | |
| 6,883,018 B1 | 4/2005 | Meiri et al. | |
| 6,886,164 B2 | 4/2005 | Meiri | |
| 6,898,685 B2 | 5/2005 | Meiri et al. | |
| 6,910,075 B2 | 6/2005 | Marshak et al. | |
| 6,938,122 B2 | 8/2005 | Meiri et al. | |
| 6,944,726 B2 | 9/2005 | Yoder et al. | |
| 6,968,369 B2 | 11/2005 | Veprinsky et al. | |
| 6,976,139 B2 | 12/2005 | Halstead et al. | |

(Continued)

OTHER PUBLICATIONS

Response to Office Action dated Apr. 18, 2022 filed Jul. 13, 2022 for U.S. Appl. No. 16/864,272; 11 pages.

(Continued)

*Primary Examiner* — Alexander Khong
(74) *Attorney, Agent, or Firm* — Daly, Crowley Mofford & Durkee, LLP

(57) ABSTRACT

A method is provided, comprising: receiving, from a host device, a request to create a token that represents one or more data items that are stored in a first volume, the first volume being stored in a source system; estimating an I/O latency limit for the first volume; estimating a token creation time for the token; comparing the token creation time to the I/O latency limit; when the token creation time matches the I/O latency limit: creating the token, creating a snapshot pair, mapping the token to the snapshot pair, and returning the token to the host device; when the token creation time does not match the I/O latency limit: creating the token, creating a first snapshot of the first volume at the source system, mapping the first snapshot to the token, and returning the token to the host device.

20 Claims, 10 Drawing Sheets

(56) References Cited

U.S. PATENT DOCUMENTS

| | | | |
|---|---|---|---|
| 7,000,086 B2 | 2/2006 | Meiri et al. |
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,468,180 B1 | 6/2013 | Meiri et al. |
| 8,578,204 B1 | 11/2013 | Ortenberg et al. |
| 8,600,943 B1* | 12/2013 | Fitzgerald ............. G06F 16/119 707/648 |
| 8,677,087 B2 | 3/2014 | Meiri et al. |
| 8,694,700 B1 | 4/2014 | Natanzon et al. |
| 8,706,959 B1 | 4/2014 | Arnon et al. |
| 8,719,497 B1 | 5/2014 | Don et al. |
| 8,732,124 B1 | 5/2014 | Arnon et al. |
| 8,782,357 B2 | 7/2014 | Halstead et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,914,596 B2 | 12/2014 | Lecrone et al. |
| 8,966,211 B1 | 2/2015 | Arnon et al. |
| 8,977,826 B1 | 3/2015 | Meiri et al. |
| 9,002,904 B1 | 4/2015 | Meiri et al. |
| 9,009,437 B1* | 4/2015 | Bjornsson ............. G06F 3/0641 718/1 |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,304,889 B1 | 4/2016 | Chen et al. |
| 9,305,009 B1 | 4/2016 | Bono et al. |
| 9,323,750 B2 | 4/2016 | Natanzon et al. |
| 9,342,465 B1 | 5/2016 | Meiri |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,483,355 B1 | 11/2016 | Meiri et al. |
| 9,524,220 B1 | 12/2016 | Veprinsky et al. |
| 9,558,083 B2 | 1/2017 | LeCrone et al. |
| 9,606,739 B1 | 3/2017 | LeCrone et al. |
| 9,606,870 B1 | 3/2017 | Meiri et al. |
| 9,753,663 B1 | 9/2017 | LeCrone et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,055,161 B1 | 8/2018 | Meiri et al. |
| 10,095,428 B1 | 10/2018 | Meiri et al. |
| 10,152,527 B1 | 12/2018 | Meiri et al. |
| 10,238,487 B2 | 3/2019 | Alon et al. |
| 10,261,853 B1 | 4/2019 | Chen et al. |
| 10,310,951 B1 | 6/2019 | Chen et al. |
| 10,324,635 B1 | 6/2019 | Meiri |
| 10,324,640 B1 | 6/2019 | Chen et al. |
| 10,324,806 B1 | 6/2019 | Kucherov et al. |
| 10,331,350 B1 | 6/2019 | Kucherov et al. |
| 10,338,851 B1 | 7/2019 | Kronrod et al. |
| 10,359,965 B1 | 7/2019 | Stronge et al. |
| 10,374,792 B1 | 8/2019 | Meiri et al. |
| 10,394,485 B1 | 8/2019 | Chen et al. |
| 10,409,520 B1 | 9/2019 | Meiri et al. |
| 10,437,855 B1 | 10/2019 | Stronge et al. |
| 10,459,632 B1 | 10/2019 | Chen et al. |
| 10,459,883 B1 | 10/2019 | Meiri et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,503,609 B1 | 12/2019 | Stronge et al. |
| 10,534,547 B2 | 1/2020 | Meiri et al. |
| 10,565,058 B1 | 2/2020 | Meiri et al. |
| 10,613,793 B1 | 4/2020 | Hu et al. |
| 2003/0158861 A1* | 8/2003 | Sawdon ............. G06F 11/2094 |
| 2015/0026132 A1 | 1/2015 | Arnaudov et al. |
| 2015/0378832 A1 | 12/2015 | Brown et al. |
| 2017/0142093 A1* | 5/2017 | Oelke ................. G06F 11/3452 |
| 2018/0275923 A1* | 9/2018 | Earhart ............... H04L 41/5019 |
| 2020/0228462 A1* | 7/2020 | Bohra .................. H04L 47/788 |
| 2021/0278973 A1* | 9/2021 | Tsuchiya ............... G06F 3/0644 |

OTHER PUBLICATIONS

Office Action dated Dec. 15, 2021 for U.S. Appl. No. 16/864,272; 12 pages.
U.S. Appl. No. 15/001,789, filed Jan. 20, 2016, Meiri et al.
U.S. Appl. No. 15/085,188, filed Mar. 30, 2016, Meiri et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.
U.S. Appl. No. 16/050,247, filed Jul. 31, 2018, Schneider et al.
U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 16/395,595, filed Apr. 26, 2019, Meiri et al.
U.S. Appl. No. 16/396,880, filed Apr. 29, 2019, Meiri et al.
U.S. Appl. No. 16/398,595, filed Apr. 30, 2019, Kucherov et al.
U.S. Appl. No. 16/521,728, filed Jul. 25, 2019, Meiri et al.
U.S. Appl. No. 16/521,730, filed Jul. 25, 2019, Meiri et al.
U.S. Appl. No. 16/516,670, filed Jul. 19, 2019, Kucherov et al.
U.S. Appl. No. 16/516,677, filed Jul. 19, 2019, Meiri et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/808,943, filed Mar. 4, 2020, Parasnis et al.
U.S. Appl. No. 16/864,272, filed May 1, 2020, Chen et al.
U.S. Appl. No. 17/029,406, filed Sep. 23, 2020, Meiri et al.
Response to Office Action dated Dec. 15, 2021 filed Feb. 14, 2022 for U.S. Appl. No. 16/864,272; 12 pages.
Final Office Action dated Apr. 18, 2022 for U.S. Appl. No. 16/864,272; 12 pages.
Office Action dated Sep. 27, 2022 for U.S. Appl. No. 16/864,272; 12 pages.

* cited by examiner

SMART DATA OFFLOAD SYNC REPLICATION

BACKGROUND

A distributed storage system may include a plurality of storage devices (e.g., storage device arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: receiving, from a host device, a request to create a token that represents one or more data items that are stored in a first volume, the first volume being stored in a source system; estimating an I/O latency limit for the first volume; estimating a token creation time for the token; comparing the token creation time to the I/O latency limit; when the token creation time matches the I/O latency limit: creating the token, creating a snapshot pair, mapping the token to the snapshot pair, and returning the token to the host device, the snapshot pair including a first snapshot of the first volume that is created at the source system and a second snapshot of a replica of the first volume that is stored at a target system; when the token creation time does not match the I/O latency limit: creating the token, creating a first snapshot of the first volume at the source system, mapping the first snapshot to the token, and returning the token to the host device.

According to aspects of the disclosure, a computing system is provided, comprising: a memory; and at least one processor that is operatively coupled to the memory, the at least one processor being configured to perform the operations of receiving, from a host device, a request to create a token that represents one or more data items that are stored in a first volume, the first volume being stored in a source system; estimating an I/O latency limit for the first volume; estimating a token creation time for the token; comparing the token creation time to the I/O latency limit; when the token creation time matches the I/O latency limit: creating the token, creating a snapshot pair, mapping the token to the snapshot pair, and returning the token to the host device, the snapshot pair including a first snapshot of the first volume that is created at the source system and a second snapshot of a replica of the first volume that is stored at a target system; when the token creation time does not match the I/O latency limit: creating the token, creating a first snapshot of the first volume at the source system, mapping the first snapshot to the token, and returning the token to the host device.

According to aspects of the disclosure, a non-transitory computer-readable medium is provided that stores one or more processor-executable instructions, which, when executed by at least one processor, cause the at least one processor to perform the operations of receiving, from a host device, a request to create a token that represents one or more data items that are stored in a first volume, the first volume being stored in a source system; estimating an I/O latency limit for the first volume; estimating a token creation time for the token; comparing the token creation time to the I/O latency limit; when the token creation time matches the I/O latency limit: creating the token, creating a snapshot pair, mapping the token to the snapshot pair, and returning the token to the host device, the snapshot pair including a first snapshot of the first volume that is created at the source system and a second snapshot of a replica of the first volume that is stored at a target system; when the token creation time does not match the I/O latency limit: creating the token, creating a first snapshot of the first volume at the source system, mapping the first snapshot to the token, and returning the token to the host device.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1A:
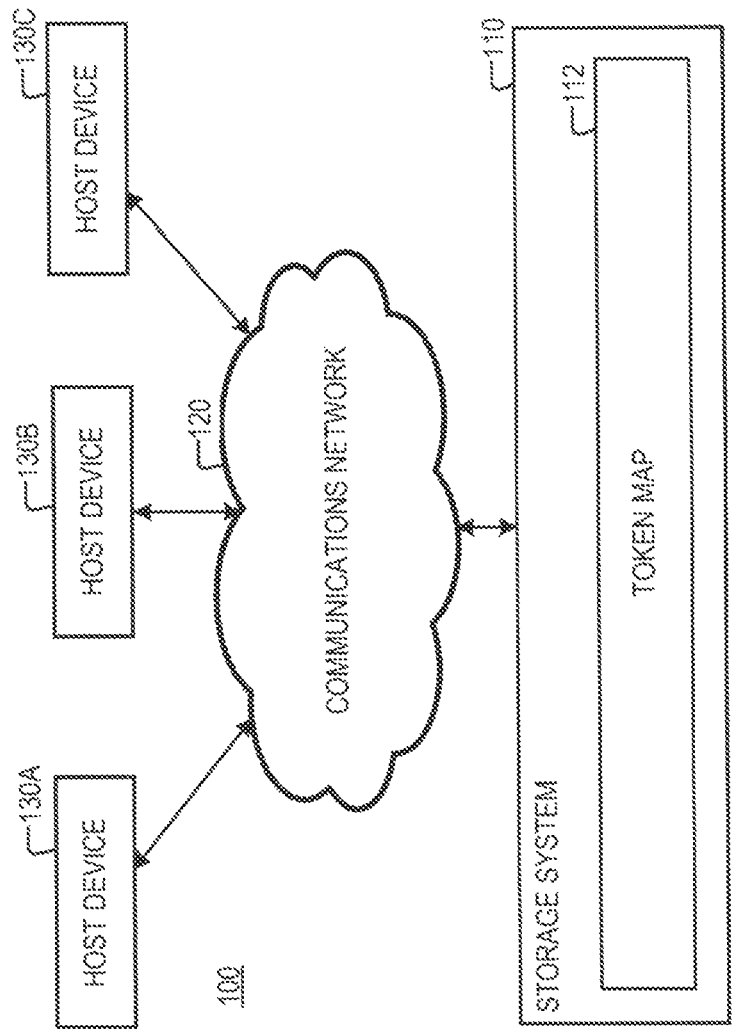
FIG. 1A is a diagram of an example of a system, according to aspects of the disclosure.

FIG. 1 is a diagram of an example of a system 100, according to aspects of the disclosure. The system 100 may include a storage system 110 that is coupled to one or more host devices 130 via a communications network 120. The storage system 110 may include a content-addressable storage system that is configured to retrieve and store data on one or more storage devices in response to I/O requests that are transmitted by the host devices 130. The communications network 120 may include a local area network (LAN), a wide area network (WAN), the Internet, and/or any or suitable type of communications network. Each of the host devices 130 may include a desktop computer, a laptop computer, a server, and/or any other suitable type of electronic device. Additionally or alternatively, each of the host devices 130 may include a file server, such as a Windows File Server™ or a Samba server, which is configured to provide an interface between the storage system 110 and client devices (or applications) that read and write data to the storage system 110.

According to the present disclosure, the storage system 110 is configured to support a token-based copy operation (e.g., a data offload operation). The token-based copy operation may be one that allows data to be copied by using a token corresponding to the data. A token-based copy operation may be similar to a conventional copy operation in that both operations copy data from one location to another location. However, a token-based copy operation may identify (or reference) the data that is copied by using a token corresponding to the data, whereas a conventional copy operation may identify (or reference) the data by using one or more addresses where the data is stored.

To support token-based copy operations, the storage system 110 may be configured to provide an interface for the creation of tokens. According to the present disclosure, any of the host devices may submit to the storage system a request to create a token. The request may identify one or more addresses in the storage system 110 and/or one or more contiguous address ranges. The addresses specified by the request may be on the same volume and/or on different volumes. In response to the request, the storage system 110 may create a token representing the data stored at the specified addresses (and/or address ranges) and return the token to the host device.

According to the present disclosure, when the storage system 110 creates a token, the storage system preserves the data that is associated with the token. As noted above, to obtain a token from the storage system 110, any of the host devices may identify one or more addresses (or address ranges) where the data is stored. However, any token that is created by the storage system is associated with the data, rather than the addresses. If any of the addresses is overwritten with new data, the token will become invalid—unless the data is preserved. For this reason, when the storage system 110 creates a token, it also preserves the data that is represented by the token.

To preserve the data that is represented by the token, when the storage system 110 creates the token, it also creates a token-specific snapshot that is associated with the token. In some implementations, the token-specific snapshot may include a snapshot of the entire logical space of the source system 210. Additionally or alternatively, in some implementations, the token-specific snapshot may include a snapshot of a portion of the logical space of the storage system. Additionally or alternatively, in some implementations, the token-specific snapshot may be a snapshot of the entire volume where the data represented by the token is stored, and, as such, it may reference other data in addition to the data that is associated with the volume. In some implementations, the token-specific snapshot may be created at the time when the token is created. Additionally or alternatively, in some implementations, the token-specific snapshot may be created after the a request to create the token is received and before the execution of subsequent write requests (i.e., write requests that are received after the request to create the token), which require the overwriting of data that is stored at one or more addresses (or address ranges) that are associated with the request to create the token.

According to the present disclosure, the token-specific snapshots can be created by using existing means for snapshot creation. In this regard, the token-specific snapshot may be created by using the same services that are used by the storage system 110 to create conventional snapshots. Accordingly, the token-specific snapshots may be the same or similar to other snapshots that are created within the storage system 110 for the purpose of returning the storage system to a specific point in time. However, in some implementations, token-specific snapshots may have different access restrictions than conventional snapshots. Unlike conventional snapshots, which can be accessible for conventional (e.g., unmapped) read/write commands, the token-specific snapshots may be accessed only for the purpose of performing token-write operations (and/or other token-based operations).

In some respects, using token-specific snapshots to preserve data that is associated with created tokens is advantageous because the token-specific snapshots can be created very quickly in comparison to copying the data to a temporary location. According to the example of FIG. 1A, the storage system 110 is configured to store a token map 112, which maps tokens to the token's corresponding token-specific snapshots. As illustrated in FIG. 1B, the token map 112 may include a plurality of entries 122. Each entry 122 may include a token identifier 122A and an identifier 122B of a token-specific snapshot that corresponds to the token that is identified by the token identifier 122A. As can be readily appreciated, the token map 112 may be used by the storage system 110 (and/or one or more storage servers that are part of the storage system 110) to identify the respective token-specific snapshot that is associated with any token issued by the storage system 110.

Figure 1B:
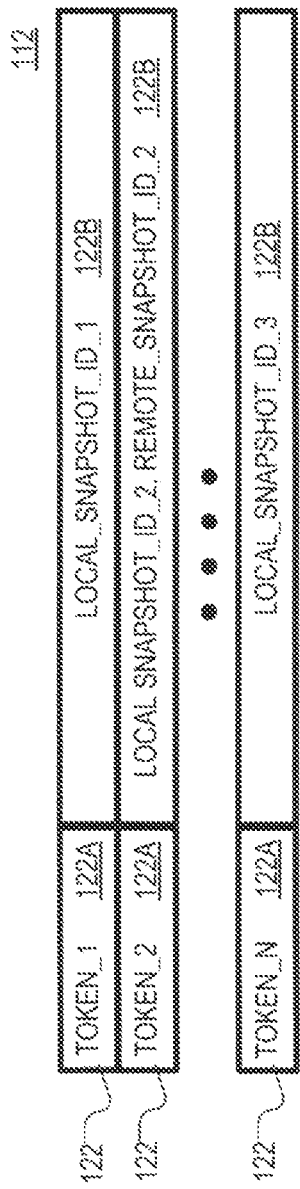
FIG. 1B is a diagram of an example of a token map, according to aspects of the disclosure.
Figure 1C:
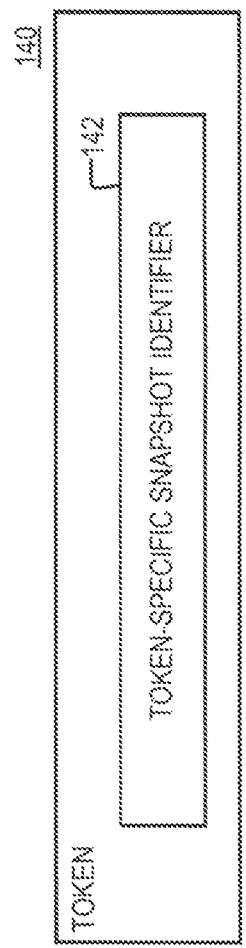
FIG. 1C is a diagram of an example of a token, according to aspects of the disclosure.

Although in the example of FIGS. 1A-B a token map is used to relate tokens with their respective token-specific snapshots, the present disclosure is not limited thereto. For example, in some implementations, any token that is issued by the storage system 110 may include an identifier corresponding to the token-specific snapshot for that token. For instance, FIG. 1C depicts an example of a token 140, which is created by the storage system 110, and which includes an identifier 142 that identifies a token-specific snapshot that is created for the token 140 (to preserve data represented by the token). The identifier 142 may include any suitable number, string, or alphanumerical string that can be used by the storage system to retrieve the token-specific snapshot.

Figure 2A:
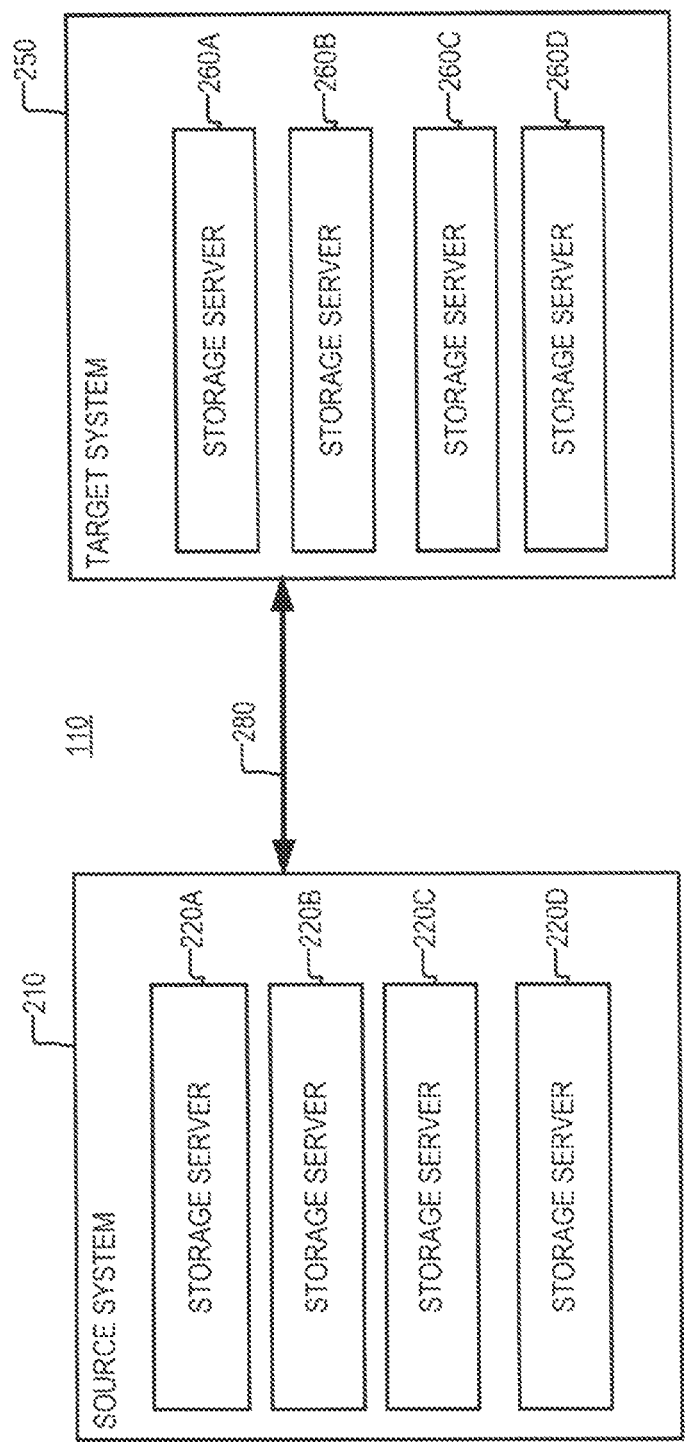
FIG. 2A is a diagram of an example of a storage system, according to aspects of the disclosure.

FIG. 2A is a diagram illustrating the storage system 110 in further detail, according to aspects of the disclosure. As illustrated, the storage system 110 may include a source system 210 that is coupled to a target system 250 via a network 280. The network 280 may include a TCP/IP network, an InfiniBand network, and/or any other suitable type of communications network. The source system 210 may include a plurality of storage servers 220 (e.g., storage servers 220A-D), and the target system 250 may include a plurality of storage servers 260 (e.g., storage servers 260A-D). In some implementations, any of the storage servers 220 and 260 may be the same or similar to the server 300, which is discussed further below with respect to FIG. 3. Although not shown, each of the source system 210 and the target system 250 may be arranged to use a different storage device array, such as the storage device array 410, which is discussed further below with respect to FIG. 4.

Figure 2B:
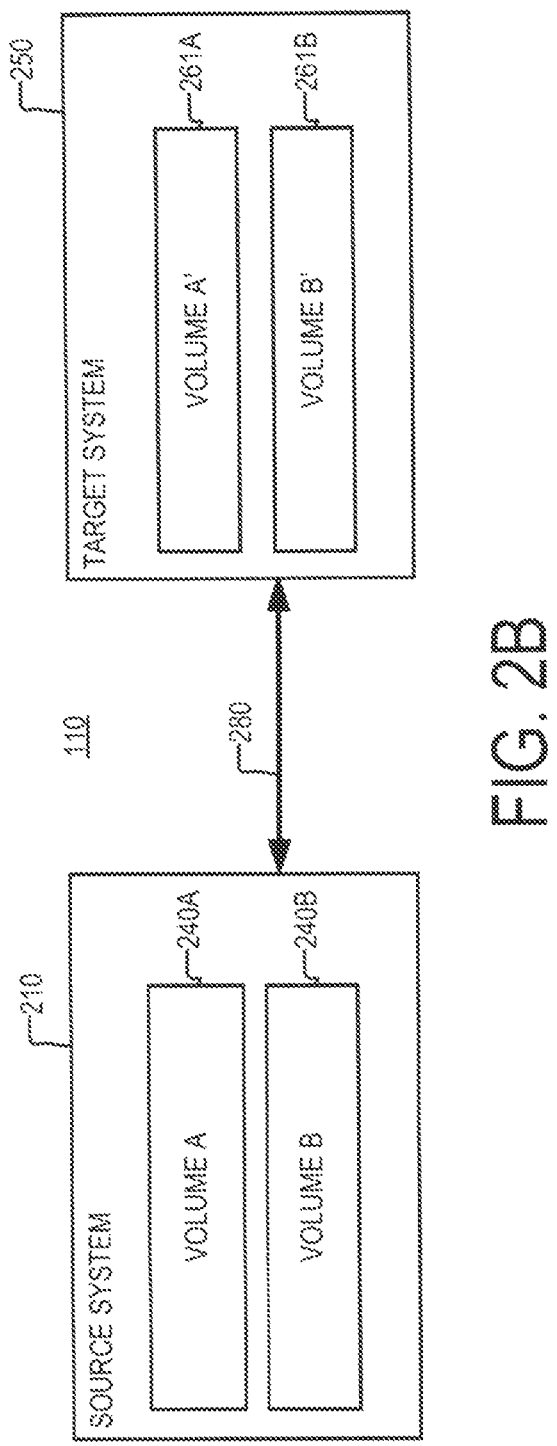
FIG. 2B is a diagram illustrating an aspect of the operation of the storage system of FIG. 2A, according to aspects of the disclosure.

FIG. 2B is a diagram illustrating the operation of the storage system 110, according to aspects of the disclosure. As illustrated, the source system 210 may store a volume 240A and a volume 240B. The source system may store a volume 261A and a volume 261B. Volume 261A may be a replica of the volume 240A and volume 261B may be a replica of the volume 240B. According to the present example, volumes 261A and 261B are maintained via synchronous replication. It will be understood that the present disclosure is not limited to any specific method for performing synchronous replication. Examples concerning the generation of replication data are discussed in further detail in U.S. Pat. No. 10,310,951, titled Storage System Asynchronous Data Replication Cycle Trigger with Empty Cycle Detection, and U.S. Pat. No. 10,324,640, titled Storage System with Consistent Initiation of Data Replication Across Multiple Distributed Processing Modules, both of which are herein incorporated by reference in their entirety.

Figure 3:
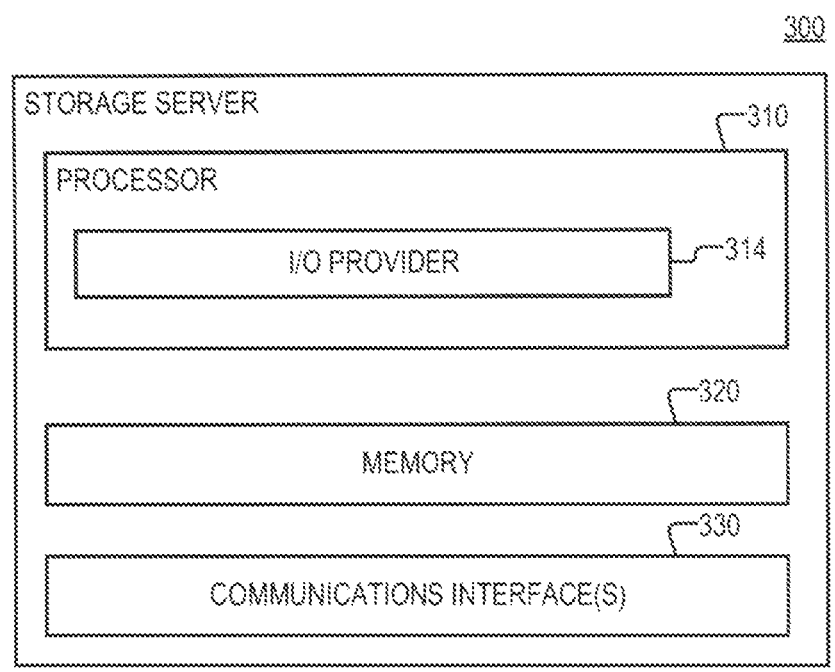
FIG. 3 is a diagram of an example of a storage server, according to aspects of the disclosure.

FIG. 3 is a diagram of an example of a server 300, according to aspects of the disclosure. As illustrated, the storage server 220 may include a processor 310, a memory 320, and a communications interface(s) 330. The processor 310 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 330 may include any suitable type of communications interface, such as one or more Ethernet adapters, one or more Wi-Fi adapters (e.g., 802.1414 adapters), and one or more Long-Term Evolution (LTE) adapters, for example. According to the present example, the processor 310 may be configured to execute an I/O provider 314. The I/O provider 314 may include one or more processes for executing incoming I/O requests (e.g., write requests). The I/O provider 314 is discussed further below with respect to FIG. 4.

Figure 4:
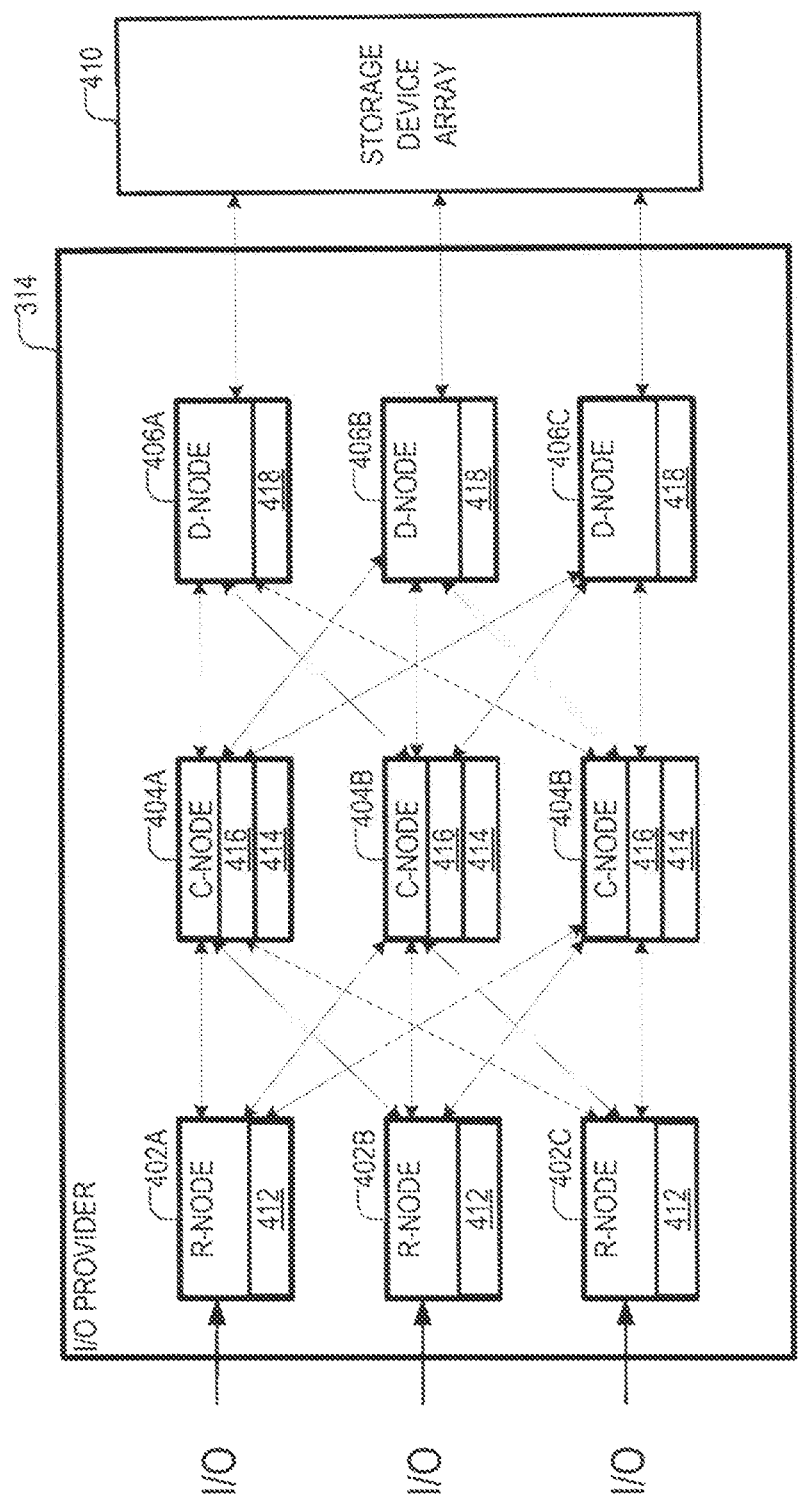
FIG. 4 is a diagram of an example of an I/O provider, according to aspects of the disclosure.

FIG. 4 is a diagram illustrating an example of one implementation of the I/O provider 314. According to the present example, the I/O provider 314 includes nodes 402, 404, and 406, which are herein referred to as routing nodes (R-nodes), control nodes (C-nodes), and data nodes (D-nodes) respectively. According to the present example, the I/O provider 314 is configured store and retrieve data from a storage device array 410. The storage device array 410 may include a Redundant Array of Independent Disks (RAID) or any other suitable type of storage device array. The storage device array 410 may include one or more a solid-state drive (SSD), a hard disk (HD), a non-volatile random-access memory (nvRAM) device, and/or any other suitable type of storage device.

The routing nodes 402 may be configured to terminate Read/Write commands received at the storage system 110 and route them to appropriate control nodes 404 and data nodes 406 for further execution. In doing so, the routing nodes 402 may distribute a workload over multiple control nodes 404 and data nodes 406. In some implementations, any of the routing nodes 402 may be configured to write I/O requests (e.g., SCSI I/O requests) to selected ones of the control nodes 404 for further processing. In some implementations, each of the routing nodes 402 may be provided with a respective address-to-control-module (A2C) table 412 that identifies a plurality of control nodes (e.g., the control nodes 404) and a different respective LDA range that is managed by each of the control nodes. In this regard, the A2C table 412 may define a plurality of logical spaces that are managed by different control nodes 404. In the present example, a copy of the A2C table 412 is stored on each of the routing nodes 402. However, it will be understood that the present disclosure is not limited to any specific method for allocating respective logical spaces to the control nodes 404.

The control nodes 404 may be configured to control the execution of control node commands supplied by the routing nodes 402. The control node commands may be used to implement read requests, write requests, and/or any other suitable I/O request. In addition, each of the control nodes 404 may maintain and manage key metadata elements. Each of the control nodes 404 may be configured to receive control node commands from the routing nodes and communicate with the data nodes 406 to execute the commands. In some implementations, each control node 404 may maintain an address-to-hash (A2H) table 414 and a hash-to-D-node (H2D) table 416. As is known in the art, the A2H table may map different logical data addresses (LDAs) to respective hash digests of user data that is stored at the LDAs, and the H2D table may map each of the hash digests to a respective data node 406.

The data nodes 406 may be configured to control the execution of data node commands supplied by the control nodes 404. Each of the data nodes 406 may be attached to one or more of the storage devices in the storage device array 410. Each of the data nodes may store in memory a hash-to-physical-address (H2P) table 418. The H2P table 418 may identify a plurality of physical addresses in the storage device array 410, and different respective hash digest that is mapped to each of the physical addresses.

As noted above, the tables 412-418 may map each of a plurality of logical addresses to a corresponding physical address in the storage device array 410. As can be readily appreciated, using the tables 412-418 enables the storage system 110 to eliminate duplicate copies of repeating data. In particular, the use of the tables 412-418 permits the same physical address in the storage device array 410 to be mapped to multiple LDAs in the storage system 110. When a read request is received for any of these LDAs, the tables 412-418 can be used to identify the physical address that is mapped to the LDA and return the data item that is stored at the physical address. This feature is commonly referred to as "data deduplication."

As noted above, in some implementations, the server 300 may be the same or similar to any of the storage servers 260 of the target system 250 (see FIG. 2A). In such implementations, the storage device array 410 may be part of the target system 250, a first LDA that is identified in the A2H table 414 may be part of the volume 210A and a second LDA may be part of the volume 261B. If any node in the storage system 110 wanted to copy a data item that is stored at the first LDA (of the volume 261A) to the second LDA (of the volume 261B), the copying of the data item may be effectuated by simply modifying the A2H table 414 to map the second LDA to the same physical address (in the storage device array 410) as the first LDA. In other words, the copying of data between volumes 261A and 261B can be performed by metadata manipulation, without performing a new write of the data to the storage device array 410. According to the present disclosure, any command that causes this type of copying to be performed is referred to as a write-via-hash command.

As noted above, in some implementations, the server 300 may be the same or similar to any of the storage servers 220 of the source system 210 (see FIG. 2A). In such implementations, the storage device array 410 may be part of the source system 210, a first LDA that is identified in the A2H table 414 may be part of the volume 240A and a second LDA may be part of the volume 240B. If any node in the storage system 110 wanted to copy a data item that is stored at the first LDA (of the volume 240A) to the second address (of the volume 240B), the copying of the data item may be effectuated by simply modifying the A2H table 414 to map the second LDA to the same physical address (in the storage device array 410) as the first LDA.

Figure 5A:
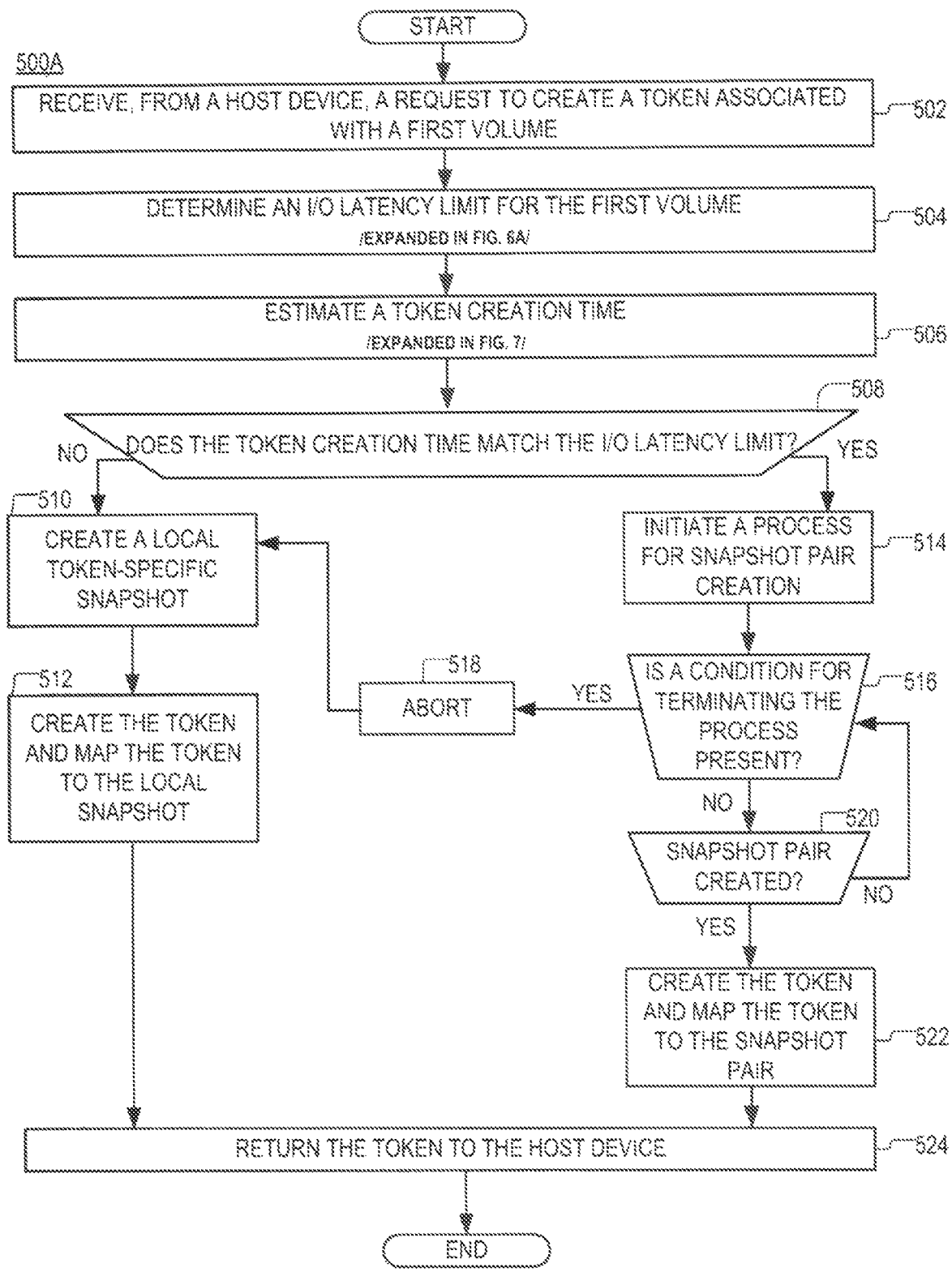
FIG. 5A is a flowchart of an example of a process, according to aspects of the disclosure.

FIG. 5A is a flowchart of an example of a process 500A for creating tokens, according to aspects of the disclosure. According to the present disclosure, the process 500A is performed by the C-node 404A (shown in FIG. 4).

At step 502, the C-node 404A receives a request to create a token that is associated with one or more addresses in the volume 240A (or more particularly with one or more data items that are stored in the volume 240A). The request may be received from the host device 130A. The request may be received via any of R-nodes 404A-C or one or more other nodes (and/or devices) that lie on a communication path between the host device 130A to the C-node 404A.

At step 504, the C-node 404A estimates a first I/O latency limit for the volume 240A. The I/O latency limit may, at least in part, indicate the maximum latency that is permissible for I/O requests to the volume 240A. For example, the I/O latency limit may identify, at least in part, the maximum permissible latency for write requests that are directed to the volume 240A. In some implementations, the I/O latency limit may be determined in accordance with a process 600, which is discussed further below with respect to FIG. 6A.

At step 506, the C-node 404A estimates a token creation time for the token. In some implementations, estimating the token creation time may include detecting how long it would take to create the token. For example, in some implementations, estimating the token creation may include estimating the duration of a period in which the token can be created or estimating a time by which the token can be created. In some implementations, the token creation time may be estimated in accordance with a process 700, which is discussed further below with respect to FIG. 7.

At step 508, the C-node 404A detects whether the token creation time (estimated at step 506) matches the I/O latency limit (estimated at step 504). In some implementations, determining whether the token creation time matches the I/O latency limit may include detecting whether the token creation is within the I/O latency limit. For example, detecting whether the token creation time matches the I/O latency limit may include detecting whether the token creation time is greater than the I/O latency limit. For example, and without limitation, if the token creation time is greater than the I/O latency limit, the token creation time may be said to not match the I/O latency limit. Otherwise, if the token creation time is less than or equal to the I/O latency limit, the token creation time may be said to not match the I/O latency limit. If the token creation does not match the I/O latency limit, the process 500A proceeds to step 510. Otherwise, if the token creation time matches the I/O latency limit, the process 500A proceeds to step 514.

At step 510, the C-node 404A creates a local token-specific snapshot in response to the request (received at step 502). According to the present disclosure, a token-specific snapshot of volume 240A that is created at the source system 210 is referred to as "a local token-specific snapshot." This is in contrast to a token-specific snapshot of the volume replica that is created at the target system 250, which is referred to as "a remote token-specific snapshot. It will be recalled that the volume 261A is a replica of the volume 240A. In this regard, it will be understood that the terms "remote" and "local" are merely used to denote the location where a token-specific snapshot of a volume is created, and they are not intended to imply anything else about the token-specific snapshot. In the example of FIG. 5, at step 510, only a local token-specific snapshot is created in response to the request to create a token. In other words, at step 510, no remote token-specific snapshot of the volume 261A is created in response to the request to create a token.

At step 512, the C-node 404A creates the token and maps the token to the local token-specific snapshot (created at step 510). In some implementations, mapping the token to the local token-specific snapshot may include generating and adding to the token map 112 an entry 122 that associates the token with the local token-specific snapshot (created at step 510). Additionally or alternatively, mapping the token to the local token-specific snapshot may include inserting in the token an identifier corresponding to the local token-specific snapshot.

At step 514, the C-node 404A initiates a process for snapshot pair creation in response to the request to create a token. The process for snapshot pair creation may include any suitable type of process that results in the creation of a local token-specific snapshot of the volume 240A (at the source system 210) and a remote token-specific snapshot of the volume 261A (at the target system 240). It will be recalled that the volume 261A is a replica of the volume 240A. The process for snapshot pair creation may include any step(s) that are normally taken by storage systems when creating snapshot pairs for a volume (and its replica). Such steps may include suspending and draining in-flight I/Os at the source system 210 and suspending and draining in-flight I/Os at the target system 250.

At step 516, the C-node 404A detects whether a condition for terminating the snapshot pair creation process is present. For example, the condition for terminating the process for snapshot pair creation may be present when an abort command is received at the C-node 404A. As another example, the condition for terminating the process for snapshot pair creation may be present if the source system 210 takes longer than a predetermined amount of time to suspend and/or drain I/Os directed to the volume 240A. As another example, the condition for terminating the process for snapshot pair creation may be present if the target system 250 takes longer than a predetermined amount of time to suspend and/or drain I/Os directed to the volume 261A. As another example, the condition for terminating the process for snapshot pair creation may be present when the process for snapshot pair creation executes for longer than a predetermined amount of time, without completing. If a condition for terminating the process for snapshot pair creation is detected, the process 500A proceeds to step 518. Otherwise, the process 500A proceeds to step 520.

At step 518, the execution of the process for snapshot pair creation is aborted, and the process 500A proceeds to step 510. In other words, the C-node 404A may monitor and dynamically adjust the process for snapshot pair creation, as it is being executed, based on environmental feedback. If a decision is made to abort the process for snapshot pair creation, only a local token-specific snapshot of the volume 240A is created in response to the request to create a token (received at step 502), after which the local token-specific snapshot is mapped to a newly-created token.

At step 520, the C-node 404A detects whether the process for snapshot pair creation has finished executing and a snapshot pair has been created as a result. As noted above, the snapshot pair may include a local token-specific snapshot of the volume 240A that is created at the source system 210 and a remote token-specific snapshot of the volume 261A (which a replica of the volume 240A) that is created at the target system 250. If the process has finished executing (and a snapshot pair has been created as a result), the process 500A proceeds to step 522. Otherwise, the process 500A returns to step 518.

At step 522, the C-node 404A creates the token and maps the token to the snapshot pair that is created as a result of executing the process for snapshot pair creation. As noted above, the snapshot pair may include a local token-specific snapshot of the volume 240A that is crated at the source system 210 and a remote token-specific snapshot of the volume 261A that is created at the target system 250. It will be recalled that the volume 261A is a replica of the volume 240A. In some implementations, mapping the token to the local token-specific snapshot may include generating and adding to the token map 112 an entry 122 that associates the token with the local and remote token-specific snapshots that are part of the snapshot pair. Additionally or alternatively, mapping the token to the snapshot pair may include inserting in the token a first identifier corresponding to the local token-specific snapshot that is part of the pair and a second identifier corresponding to the remote token-specific snapshot that is part of the pair.

At step 524, the C-node 404A returns the token to the host device 130A.

Figure 5B:
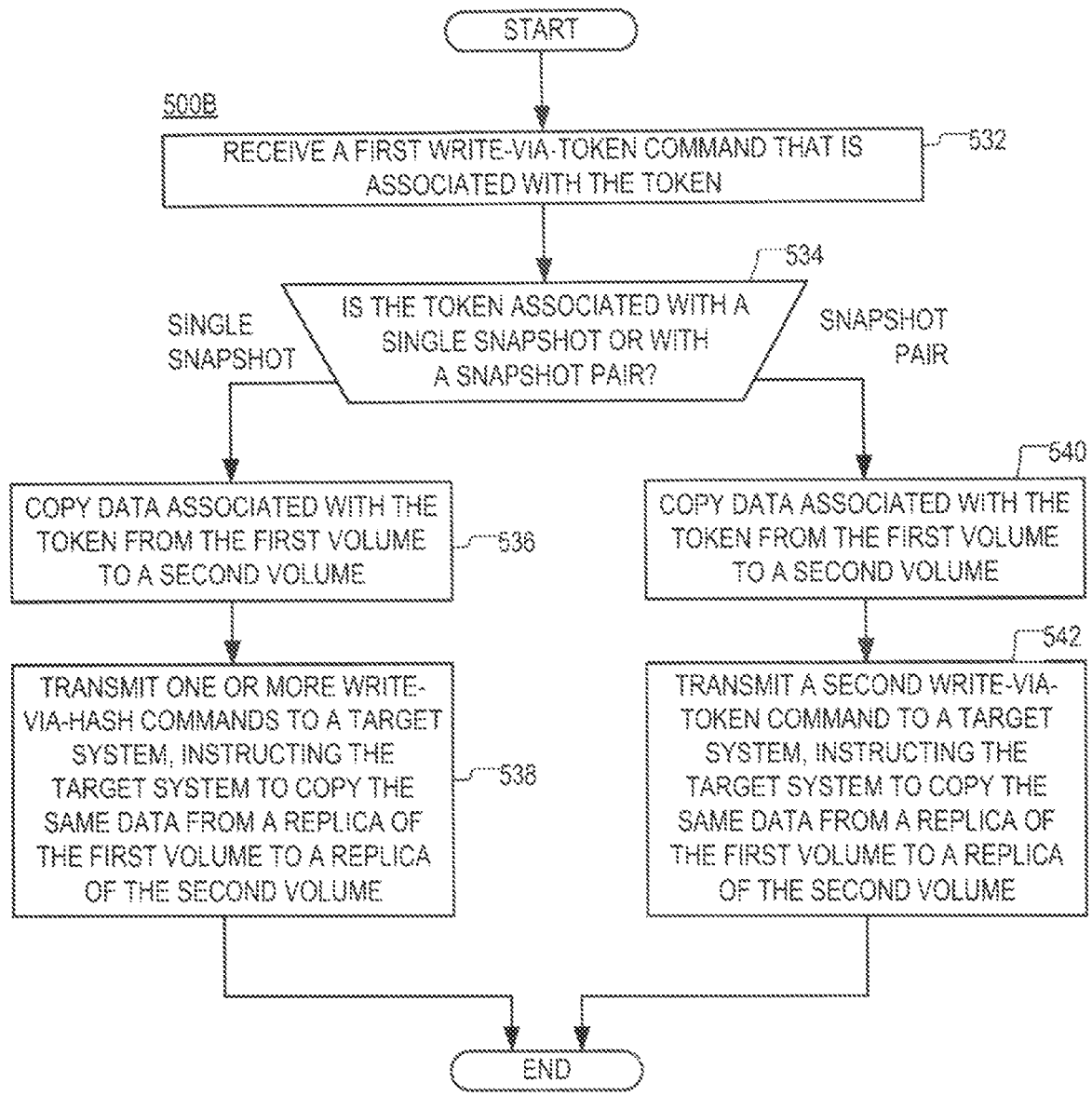
FIG. 5B is a flowchart of an example of a process, according to aspects of the disclosure.

FIG. 5B is a flowchart of an example of a process 500B for executing a write-via-token command, according to aspects of the disclosure. According to the present disclosure, the process 500B is performed by the C-node 404A (shown in FIG. 4).

At step 532, the C-node 404A receives a first write-via-token command that is associated with a token. The token associated with the first write-via-token command may be one that is created in accordance with the process 500A. The write via token command may include an ODX command, an XCOPY command, and/or any other suitable type of write-via-token command. The write-via-token command may instruct the C-node 404A to copy data that is stored in volume 240A, at the one or more addresses that are associated with the token, to the volume 240B (e.g., copy one or more data items that are associated with the token). The first write-via-token command may be received from the host device 130A. The first write-via-token may be received via any of the R-nodes 402A-C and/or any other node (or computing device) that lies on a communications path between the C-node 404A and the host device 130A.

At step 534, the C-node 404A determines whether the token is associated with a single token-specific snapshot or a snapshot pair. As noted above, if the token is created by executing steps 510-512 of the process 500A, the token would be associated with a single token-specific snapshot (i.e., associated with a local token-specific snapshot only). On the other hand, if the token is created by executing steps 514-522 of the process 500A, the token would be associated with a snapshot pair (i.e., associated with a local token-specific snapshot and a remote token-specific snapshot). If the token is associated with a single token-specific snapshot, the process 500B proceeds to step 536. Otherwise, if the token is associated with a snapshot pair, the process 500B proceeds to step 540.

At step 536, the C-node 404A copies one or more data items that are associated with the token from volume 240A to volume 240B. In some implementations, the copying may be performed by using the local token-specific snapshot corresponding to the token (e.g., when addresses associated with the token have been overwritten).

At step 538, the C-node 404A transmits write-via-hash command(s) to the target system 250. Each write-via-hash commands may instruct the target system 250 to copy a data item associated with the token from volume 261A (which is a replica of volume 240A) to volume 261B (which is a replica of volume 240B). If the one or more data items associated with the token have been overwritten in the volume 261A, the C-node 404A may retrieve those data items from the local token-specific snapshot and provide the retrieved data items to the target system.

At step 540, the C-node 404A copies one or more data items that are associated with the token from the volume 240A to the volume 240B. In some implementations, the copying may be performed by using the local token-specific snapshot corresponding to the token (e.g., when addresses associated with the token have been overwritten).

At step 542, the C-node 404A transmits a second write-via-token command to the target system 250. The second write-via-token command instructs the target system 250 to copy the one or more data items that are associated with the token from volume 261A (which is a replica of volume 240A) to volume 261B (which is a replica of volume 240B). In some implementations, the copying may be performed by using the remote token-specific snapshot corresponding to the token (e.g., when addresses associated with the token have been overwritten).

FIG. 5A provides an example of a technique for token creation in which a token can be associated with either a single token-specific snapshot a snapshot pair, depending on the current state of the storage system 110 (and/or source system 210). As can be readily appreciated, creating a single snapshot pair is less resource-intensive than creating a snapshot pair.

FIG. 5B provides an example of a technique for executing data offload commands (e.g., write-via-token commands). According to the technique, when a token is associated with a single token-specific snapshot, data offload commands associated with the token are replicated by using write-via-hash commands. On the other hand, when a token is associated with a single token-specific snapshot, data offload commands associated with the token are replicated via data offload commands. Replicating data offload commands via write-via-hash commands is more resource-intensive, because a single data offload command that is received at a target system may require multiple write-via-hash commands to be submitted to a corresponding target system in order for the data offload command to be replicated. By contrast, replicating the data offload command via another data offload command would require a single instruction to be submitted to the corresponding target system.

Together, FIGS. 5A and 5B provide an example of a technique in which: (A) a less-resource-intensive method for creating a token is paired with a more resource-intensive method for replicating data offload requests that are associated with the token, and (B) a more-resource-intensive method for creating a token is paired with a less resource-intensive method for replicating data offload requests that are associated with the token. In other words, this approach allows the resource expenditure of a system that is associated with using tokens to be frontloaded (e.g., by creating a remote token-specific snapshot when a token is created) or delayed (e.g., by replicating write commands associated with the token via hash manipulation), depending on the state of the storage system. Doing so may help minimize I/O jitter for latency-sensitive applications, and thus improve the operation of the storage system.

Although in the example of FIGS. 5A-B, the processes 500A-B are performed by a C-node, the present disclosure is not limited thereto. In this regard, it will be understood that each of the processes 500A and 500B can be performed by any computing device and/or storage system node. Although in the example of FIGS. 5A-B, the processes 500A-B are performed by a content-addressable storage system, the present disclosure is not limited thereto. In this regard, it will be understood that each of the processes 500A and 500B can be performed in any storage system. Although at step 538 write-via-hash commands are used, alternative implementations are possible in which another type of write command is utilized to copy data item(s) associated with the token. Although in the processes 500A and 500B token-specific snapshots are created and used, alternative implementations are possible in which another type of snapshots are created and used. Stated succinctly, the present disclosure is not limited to any specific type of snapshot being used.

FIG. 6 is a flowchart of an example of a process for estimating an I/O latency limit of a volume, as specified by step 504 of the process 500A.

At step 602, the C-node 404A identifies a quality-of-service (QoS) guarantee that is associated with the volume 240A. The QoS guarantee may be retrieved from a configuration file of the source system 210. The QoS guarantee may include any number, string, or alphanumerical string that indicates a maximum permissible latency for I/Os (e.g., write requests, etc.) to the volume 240A.

At step 604, the C-node 404A identifies an application profile that is associated with the volume 240A. The application profile may include a number, string, or alphanumerical string that identifies a type of application that is using the volume 240A. For example, the application profile may indicate that the volume 240A is used by a database application. As another example, the application profile may indicate that volume 240A is used by a streaming application. As another example, the application profile may indicate that the volume 240A is for general data storage (e.g., storage of text documents, etc.). In some respects, the application profile may be indicative of how latency-sensitive is an application that is reading or writing data to the volume 240A.

At step 606, the C-node 404A identifies a current workload of the volume 240A (and/or the source system 210 in general). Identifying the current workload of the volume 240A may include identifying any metric that indicates the how busy the volume 240A is when step 606 is performed. The current workload of the volume may be identified based on a cluster heartbeat that is associated with the source system 210 (and/or volume 240A), or a current workload of an application that is using the volume (e.g., database workload). In some implementations, the current workload of the volume 240A may identify the rate at which the volume 240A is receiving I/O requests.

At step 608, the C-node 404A estimates the I/O latency limit of the volume 240A based on at least one of the of: (i) the QoS guarantee that is associated with the volume 240A, (ii) the application profile associated with the volume 240A, and (iii) the current workload of the volume 240A.

In some implementations, estimating the I/O latency limit of the volume 240A based on a QoS guarantee associated with the volume 240A may include setting the I/O latency limit of the volume 240A to equal the QoS guarantee. For instance, if the QoS guarantee specifies that write requests directed to the volume should be serviced in less than 1 ms, then the I/O latency limit of the volume 240A may be set to 1 ms.

Figures 6A, 6B, 6C:
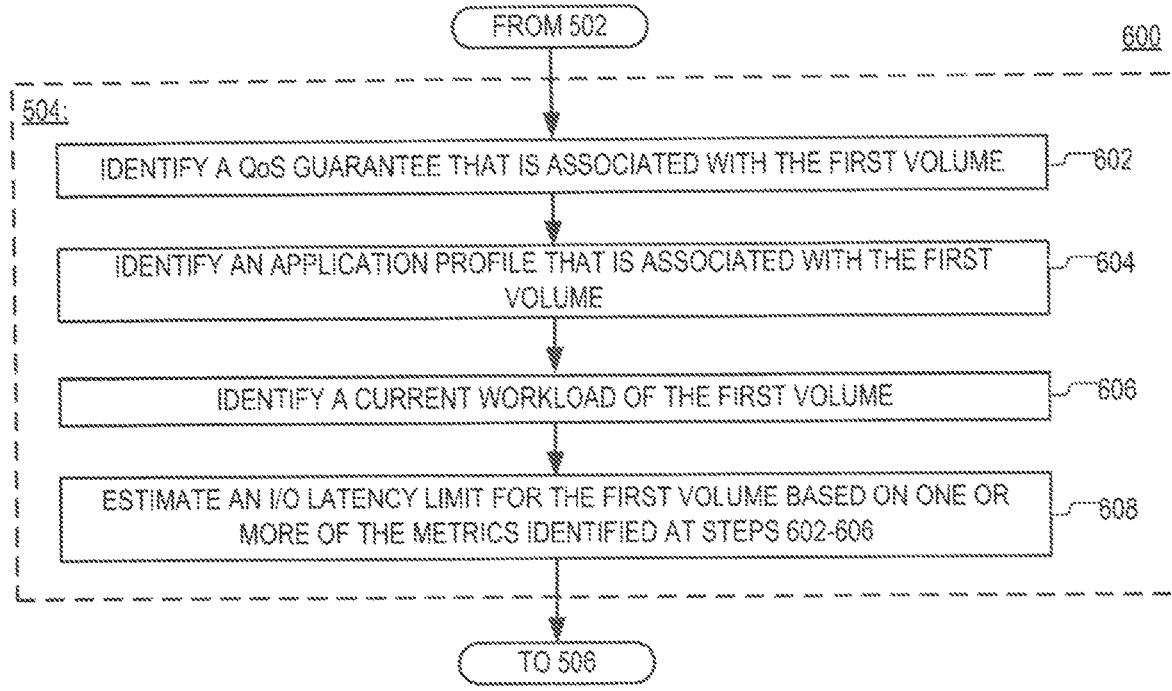
FIG. 6A is a flowchart of an example of a process, according to aspects of the disclosure.
FIG. 6B is a diagram of an example of a data structure, according to aspects of the disclosure.
FIG. 6C is a diagram of an example of a data structure, according to aspects of the disclosure.

In some implementations, estimating the I/O latency limit of the volume 240A based on an application profile associated with the volume 240A may include retrieving the I/O latency limit from a data structure, such as the data structure 610, which is shown in FIG. 6B. The I/O latency limit may be retrieved based on the application profile (identified at step 604). The data structure 610 may map different application profiles to corresponding I/O latency limits. According to the example of FIG. 6B, the data structure 610 maps: a first application profile to a first I/O latency limit; a second application profile to a second I/O latency limit; and a third application profile to a third I/O latency limit. For instance, the data structure 610 may specify that when the volume 240A is being used by a database, the volume 240A should be assigned a low I/O latency limit, whereas if the volume 240A is being used by a word processor, the volume 240A should be assigned a larger I/O latency limit (e.g., because word processors are less latency-sensitive than databases, etc.).

In some implementations, estimating the I/O latency limit of the volume 240A based on a current workload of the volume 240A may include retrieving the I/O latency limit from a data structure, such as the data structure 620, which is shown in FIG. 6B. The I/O latency limit may be retrieved based on the application profile (identified at step 604). The data structure 620 may map different workload levels to corresponding I/O latency limits. According to the example of FIG. 6B, the data structure maps: a first workload level to a first I/O latency limit; a second workload level to a second I/O latency limit; and a third workload level to a third I/O latency limit. By way of example, the data structure 620 may specify an inverse relationship between workload level and the I/O latency limit of the volume 240A, such that the lower the workload on the volume 240A, the higher the I/O latency limit.

In some implementations, estimating the I/O latency limit based on all three of: (i) the QoS guarantee that is associated with the volume 240A, (ii) the application profile associated with the volume 240A, and (iii) the current workload of the volume may include: estimating a first I/O latency limit based on the QoS guarantee, estimating a second I/O latency limit based on the application profile, estimating a third I/O latency limit based on the current workload, identifying the smallest one of the first, second, and third I/O latency limits, and setting the identified I/O latency limit as the I/O latency limit of the volume 240A.

FIG. 6A-C are provided as an example only. Those of ordinary skill in the art will readily recognize, after reading this disclosure, that there are various system metrics that can be used to estimate a maximum permissible (or desirable) I/O latency of a volume. Moreover, those of ordinary skill in the art will readily recognize, after reading this disclosure, that there are various ways in which such system metrics can be combined (or otherwise used) to estimate a maximum permissible (or desirable) I/O latency limit of a volume. Stated succinctly, the present disclosure is not limited to any specific method for determining the I/O latency limit of the volume 240A.

Figure 7:
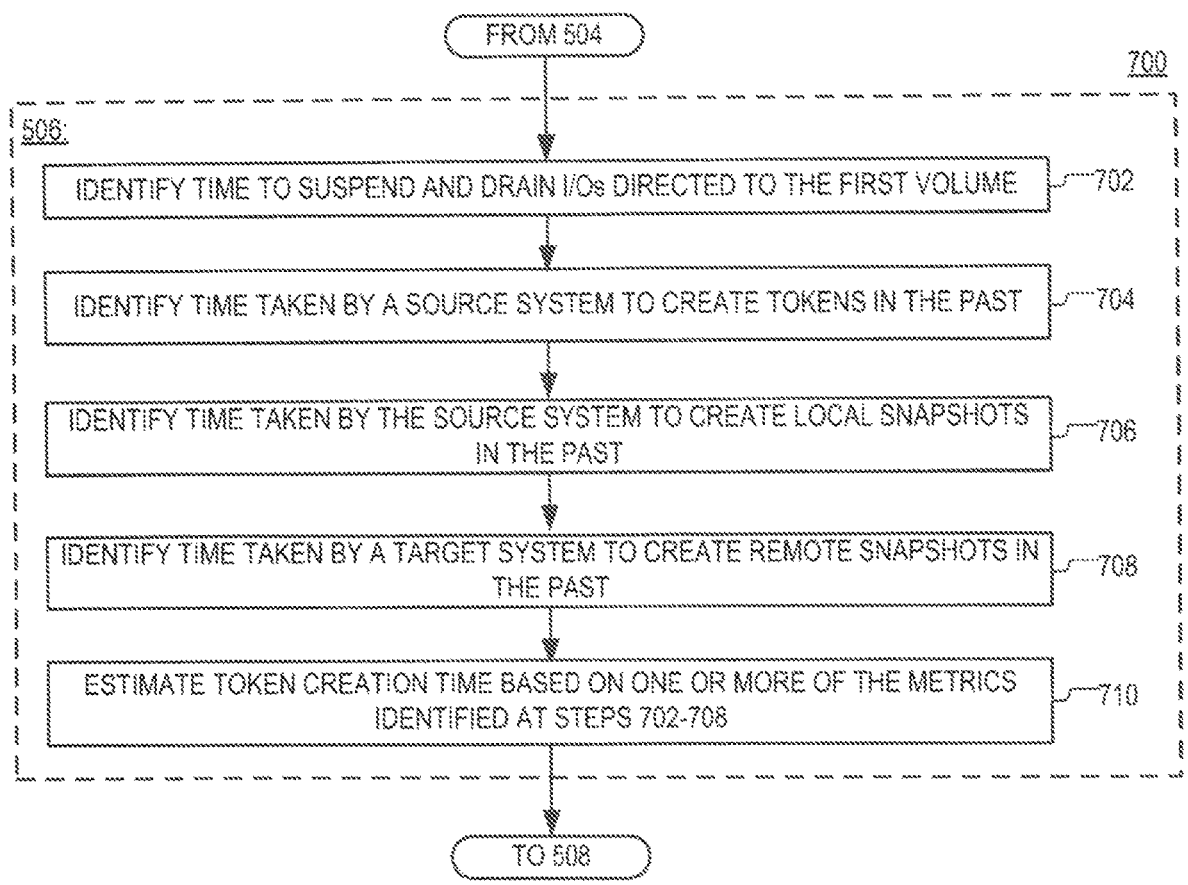
FIG. 7 is a flowchart of an example of a process, according to aspects of the disclosure.

FIG. 7 is a flowchart of an example of a process 700 for estimating token creation time, as specified by step 506 of the process 500A.

At step 702, the source system 210 identifies a time to suspend and drain pending I/Os that are directed to the volume. For example, the source system 210 may identify count of in-flight I/Os to the volume 240A and estimate the time it would take to complete the I/Os based on the average latency exhibited by the volume 240A in a predetermined past period (e.g., in the last five minutes). Put differently, the time to suspend and drain pending I/Os may be determined based on historical data indicating the latency of I/O requests associated with the volume 240A and/or I/O performance statistics.

At step 704, the source system 210 identifies the time taken by the storage system 110 (or source system 210) to create one or more tokens in the past. In some implementations, the source system 210 may identify the average time taken in the past to create tokens that have been specifically associated with snapshot pairs (as opposed to single token-specific snapshots). Additionally or alternatively, in some implementations, instead of taking averages, the source system 210 may identify the longest time it took the source system 210 to create a token (e.g., any token or specifically a token associated with a snapshot pair) in a predetermined past period (e.g., in the last 5 minutes, etc.).

At step 706, the source system 210 identifies the time taken by the source system 210 to create local token-specific snapshots of the volume 240A in the past. For example, the source system 210 may identify the average time it took to create local token-specific snapshots in the past (e.g., the average time it took the source system 210 to create five most recent local token-specific snapshots). Additionally or alternatively, in some implementations, instead of taking averages, the source system 210 may identify the longest time it took the source system 210 to create a local token-specific snapshot in a predetermined past period (e.g., in the last 5 minutes, etc.).

At step 708, the source system 210 identifies time taken by the target system 250 to create remote token-specific snapshots of the volume 240A in the past. For example, the source system 210 may identify an average time the target system 250 to create remote token-specific snapshots in the past (e.g., the average time it took the target system 250 to create five most recent token-specific snapshots). Additionally or alternatively, in some implementations, instead of taking averages, the source system 210 may identify the longest time it took the target system 250 to create a remote token-specific snapshot in a predetermined past period (e.g., in the last 5 minutes, etc.).

At step 710, the source system 210 sets the token creation time based on one or more of the metrics identified at steps 702-708. In some implementations, the source system 210 may set the token creation time to equal the sum of the metrics identified at steps 702-708. In some implementations, the metrics discussed with respect to steps 702-708 may be obtained from one or more system logs of the storage system 110.

FIG. 7 is provided as an example only. Those of ordinary skill in the art will readily recognize, after reading this disclosure, that there are various system metrics that can be used to estimate the token creation time of a volume. Moreover, those of ordinary skill in the art will readily recognize, after reading this disclosure, that there are various ways in which such system metrics can be combined to estimate the token creation time.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

As used throughout the disclosure, the term "storage system" may refer to one or more of: (i) a distributed storage system including a source system and a target system, (ii) the target system, or (iii) the source system.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   receiving, from a host device, a request to create a token that represents one or more data items that are stored in a first volume, the first volume being stored in a source system;
   estimating an input-output (I/O) latency limit for the first volume;
   estimating a token creation time for the token, the token creation time being an amount of time that is needed to create the token;
   comparing the token creation time to the I/O latency limit;
   when the token creation time matches the I/O latency limit: creating the token, creating a snapshot pair, mapping the token to the snapshot pair, and returning the token to the host device, the snapshot pair including a first snapshot of the first volume that is created at the source system and a second snapshot of a replica of the first volume that is stored at a target system; and
   when the token creation time does not match the I/O latency limit: creating the token, creating a first snapshot of the first volume at the source system, mapping the first snapshot to the token, and returning the token to the host device.

2. The method of claim 1, wherein no snapshots of the replica of the first volume are created in response to the request to create a token, when the token creation time does not match the I/O latency limit.

3. The method of claim 1, wherein the I/O latency limit is estimated based on at least one of: (i) a QoS configuration of the source system, (ii) an application profile that is associated with the first volume, or (iii) a workload on the source system.

4. The method of claim 1, wherein the token creation time is estimated based on one or more of: (i) time to suspend and drain pending I/Os that are associated with the first volume, (ii) historical data associated with one or more snapshots of the first volume that were created in the past, and (iii) historical data associated with one or more snapshots of the replica of the first volume that were created in the past.

5. The method of claim 1, wherein:
   creating the snapshot pair includes initiating a process for creating the snapshot pair,
   the snapshot pair is created only when no conditions for terminating the process are detected during execution of the process, and
   when a condition for terminating the process is detected during the execution of the process, the process is aborted, and only the first snapshot of the first volume is created and mapped to the token.

6. The method of claim 1, further comprising:
   receiving, at the source system, a first write-via-token command that is associated with the token, the first write-via-token command instructing the source system to copy the one or more data items from the first volume to a second volume;
   detecting whether the token is mapped to a snapshot pair or to a single snapshot;
   when the token is mapped to a snapshot pair: copying the one or more data items from the first volume to the second volume, and transmitting to the target system a second write-via-token command that instructs the target system to copy to the one or more data items from the replica of the first volume to a replica of the second volume; and
   when the token is mapped to a single snapshot: copying the one or more data items from the first volume to the second volume; and transmitting to the target system one or more write-via-hash commands that instruct the target system to copy to the one or more data items from the replica of the first volume to the replica of the second volume.

7. The method of claim 1, wherein the source system and the target system are part of a content-addressable storage system.

8. A computing system, comprising:
   a memory; and
   at least one processor that is operatively coupled to the memory, the at least one processor being configured to perform the operations of:
   receiving, from a host device, a request to create a token that represents one or more data items that are stored in a first volume, the first volume being stored in a source system;
   estimating an input-output (I/O) latency limit for the first volume;

estimating a token creation time for the token, the token creation time being an amount of time that is needed to create the token;

comparing the token creation time to the I/O latency limit;

when the token creation time matches the I/O latency limit: creating the token, creating a snapshot pair, mapping the token to the snapshot pair, and returning the token to the host device, the snapshot pair including a first snapshot of the first volume that is created at the source system and a second snapshot of a replica of the first volume that is stored at a target system; and when the token creation time does not match the I/O latency limit: creating the token, creating a first snapshot of the first volume at the source system, mapping the first snapshot to the token, and returning the token to the host device.

9. The computing system of claim 8, wherein no snapshots of the replica of the first volume are created in response to the request to create a token, when the token creation time does not match the I/O latency limit.

10. The computing system of claim 8, wherein the I/O latency limit is estimated based on at least one of: (i) a QoS configuration of the source system, (ii) an application profile that is associated with the first volume, or (iii) a workload on the source system.

11. The computing system of claim 8, wherein the token creation time is estimated based on one or more of: (i) time to suspend and drain pending I/Os that are associated with the first volume, (ii) historical data associated with one or more snapshots of the first volume that were created in the past, and (iii) historical data associated with one or more snapshots of the replica of the first volume that were created in the past.

12. The computing system of claim 8, wherein:

creating the snapshot pair includes initiating a process for creating the snapshot pair, the snapshot pair is created only when no conditions for terminating the process are detected during execution of the process, and when a condition for terminating the process is detected during the execution of the process, the process is aborted, and only the first snapshot of the first volume is created and mapped to the token.

13. The computing system of claim 8, wherein the at least one processor is further configured to perform the operations of:

receiving, at the source system, a first write-via-token command that is associated with the token, the first write-via-token command instructing the source system to copy the one or more data items from the first volume to a second volume;

detecting whether the token is mapped to a snapshot pair or to a single snapshot;

when the token is mapped to a snapshot pair: copying the one or more data items from the first volume to the second volume, and transmitting to the target system a second write-via-token command that instructs the target system to copy to the one or more data items from the replica of the first volume to a replica of the second volume; and when the token is mapped to a single snapshot: copying the one or more data items from the first volume to the second volume; and transmitting to the target system one or more write-via-hash commands that instruct the target system to copy to the one or more data items from the replica of the first volume to the replica of the second volume.

14. The computing system of claim 8, wherein the source system and the target system are part of a content-addressable storage system, and the computing system is part of the source system.

15. A non-transitory computer-readable medium storing one or more processor-executable instructions, which, when executed by at least one processor, cause the at least one processor to perform the operations of:

receiving, from a host device, a request to create a token that represents one or more data items that are stored in a first volume, the first volume being stored in a source system;

estimating an input-output (I/O) latency limit for the first volume;

estimating a token creation time for the token, the token creation time being an amount of time that is needed to create the token;

comparing the token creation time to the I/O latency limit;

when the token creation time matches the I/O latency limit: creating the token, creating a snapshot pair, mapping the token to the snapshot pair, and returning the token to the host device, the snapshot pair including a first snapshot of the first volume that is created at the source system and a second snapshot of a replica of the first volume that is stored at a target system; and when the token creation time does not match the I/O latency limit: creating the token, creating a first snapshot of the first volume at the source system, mapping the first snapshot to the token, and returning the token to the host device.

16. The non-transitory computer-readable medium of claim 15, wherein no snapshots of the replica of the first volume are created in response to the request to create a token, when the token creation time does not match the I/O latency limit.

17. The non-transitory computer-readable medium of claim 15, wherein the I/O latency limit is estimated based on at least one of: (i) a QoS configuration of the source system, (ii) an application profile that is associated with the first volume, or (iii) a workload on the source system.

18. The non-transitory computer-readable medium of claim 15, wherein the token creation time is estimated based on one or more of: (i) time to suspend and drain pending I/Os that are associated with the first volume, (ii) historical data associated with one or more snapshots of the first volume that were created in the past, and (iii) historical data associated with one or more snapshots of the replica of the first volume that were created in the past.

19. The non-transitory computer-readable medium of claim 15, wherein:

creating the snapshot pair includes initiating a process for creating the snapshot pair, the snapshot pair is created only when no conditions for terminating the process are detected during execution of the process, and when a condition for terminating the process is detected during the execution of the process, the process is aborted, and only the first snapshot of the first volume is created and mapped to the token.

20. The non-transitory computer-readable medium of claim 15, wherein the one or more processor-executable instructions, when executed by the at least one processor, further cause the at least one processor to perform the operation of:

receiving, at the source system, a first write-via-token command that is associated with the token, the first write-via-token command instructing the source system to copy the one or more data items from the first volume to a second volume;

detecting whether the token is mapped to a snapshot pair or to a single snapshot;

when the token is mapped to a snapshot pair: copying the one or more data items from the first volume to the second volume, and transmitting to the target system a second write-via-token command that instructs the target system to copy to the one or more data items from the replica of the first volume to a replica of the second volume; and when the token is mapped to a single snapshot: copying the one or more data items from the first volume to the second volume; and transmitting to the target system one or more write-via-hash commands that instruct the target system to copy to the one or more data items from the replica of the first volume to the replica of the second volume.

* * * * *